United States Patent
Yamamoto et al.

(10) Patent No.: US 6,682,706 B1
(45) Date of Patent: Jan. 27, 2004

(54) CATALYTIC CONVERTER FOR AUTOMOTIVE POLLUTION CONTROL, AND PROCESS FOR MAKING CATALYTIC CONVERTER

(75) Inventors: Mari Yamamoto, Ikeda (JP); Hirohisa Tanaka, Ikeda (JP); Koji Yamada, Ikeda (JP)

(73) Assignee: Daihatsu Motor Co., Ltd., Osaka (JP)

(*) Notice: Subject to any disclaimer, the term of this patent is extended or adjusted under 35 U.S.C. 154(b) by 0 days.

(21) Appl. No.: 09/456,321

(22) Filed: Dec. 8, 1999

(30) Foreign Application Priority Data

Dec. 9, 1998 (JP) ............................ 10-349818

(51) Int. Cl.$^7$ .................. B01D 53/94; B01J 21/06
(52) U.S. Cl. ................ 422/180; 422/177; 502/304
(58) Field of Search .................. 502/78, 303, 304, 502/102, 103; 422/177, 180

(56) References Cited

U.S. PATENT DOCUMENTS

| | | | |
|---|---|---|---|
| 5,139,992 A | 8/1992 | Tauster et al. | 502/304 |
| 5,837,642 A | 11/1998 | Tanaka et al. | 502/304 |

FOREIGN PATENT DOCUMENTS

| | | | | |
|---|---|---|---|---|
| DE | 198 05 259 A1 | 8/1998 | ............ | C01G/25/00 |
| EP | 0 428 753 A1 | 5/1991 | ............ | B01J/23/56 |
| EP | 0 605 274 A1 | 7/1994 | | |
| EP | 0 611 192 A1 | 8/1994 | ............ | C01G/25/00 |
| EP | 0 637 461 A1 | 2/1995 | ............ | B01D/53/94 |
| EP | 0 778 071 A1 | 6/1997 | ............ | B01D/53/94 |
| FR | 2 748 740 | 11/1997 | ............ | C01G/25/02 |
| FR | 2 757 425 | 6/1998 | ............ | B01D/53/94 |
| JP | 62282641 A | 12/1987 | ............ | B01J/23/56 |
| JP | 63077544 A | 4/1988 | ............ | B01J/23/56 |
| JP | 63156545 A | 6/1988 | ............ | B01J/23/56 |
| JP | 02043951 A | 2/1990 | ............ | B01J/23/56 |
| JP | 3-154635 | 2/1991 | ............ | B01J/23/56 |
| JP | 04284847 A | 10/1992 | ............ | B01J/23/56 |
| JP | 06063403 | 3/1994 | ............ | B01J/23/56 |

*Primary Examiner*—Hien Tran
(74) *Attorney, Agent, or Firm*—Michael D. Bednarek; Shaw Pittman LLP

(57) ABSTRACT

A catalytic converter for cleaning exhaust gas includes a heat-resistant support, and a coating formed on the support. The coating includes at least one kind of catalytically active substance and a zirconium oxide. The zirconium oxide has a pre-aging specific surface area I and a post-aging specific surface area A, wherein the aging is performed in an atmosphere of 1,000° C. for 5 hours, and wherein $A/I \geq 0.4$ and $I \geq 40$ m$^2$/g.

6 Claims, No Drawings

CATALYTIC CONVERTER FOR AUTOMOTIVE POLLUTION CONTROL, AND PROCESS FOR MAKING CATALYTIC CONVERTER

BACKGROUND OF THE INVENTION

1. Field of the Invention

The present invention relates to a catalytic converter for effectively cleaning the exhaust gas of an automotive internal combustion engine by removal of nitrogen oxide ($NO_x$), carbon monoxide (CO) and hydrocarbons (HC). The present invention also relates to a process for making such a catalytic converter.

2. Description of the Related Art

As is well known, the exhaust gas of an automotive internal combustion engine inevitably contains harmful substances such as $NO_x$, CO and HC. In recent years, particularly, the restrictions on exhaust gas cleaning are increasingly strict for environmental protection.

A so-called three-way catalytic converter has been most widely used for removing the above-described harmful substances. Typically, a three-way catalytic converter includes a honeycomb support made of a heat-resistant material such as cordierite, and a wash-coat formed on the surfaces of the respective cells of the honeycomb support. The wash-coat contains a catalytically active substance such as Pt, Pd and/or Rh, and carrier oxide powder such as zirconium oxide powder for supporting the catalytically active substance. The catalytically active substance reduces $NO_x$ to $N_2$ while oxidizing CO and HC to $CO_2$ and $H_2O$, respectively.

However, it has been found that the grains or particles of zirconium oxide powder (as the carrier oxide) grows due to sintering at high temperature. Such grain growth of zirconium oxide results in a decrease of surface area, consequently lowering the catalytic activity of the catalytic converter as a whole. Particularly, if the catalytic converter is mounted near the engine, it may be frequently subjected to an extremely high temperature of no less than 900° C. (or sometimes even higher than 1,000° C.), which prompts the grain growth of zirconium oxide powder.

A conventional counter measure against such a problem is to lower the heat-treating temperature at the time of preparing zirconium oxide powder and/or at the time of coating the prepared zirconium oxide powder onto the honeycomb support for increasing the initial specific surface area of the zirconium oxide powder. It is true that such a counter measure allows for a subsequent decrease of the specific surface area, thereby prolonging the time needed until the specific surface area of the zirconium oxide powder drops to a certain level. On the other hand, however, an initial increase of the specific surface area results in a greater extent of sintering (i.e., a greater decrease of the specific surface area) upon lapse of a relatively long time, thereby causing the catalytically active substance (Pt, Rh and/or Pd) to be buried in the sintered zirconium oxide powder. As a result, the catalytic activity of the catalytic converter drops remarkably in the long run.

DISCLOSURE OF THE INVENTION

It is, therefore, an object of the present invention to provide a catalytic converter for cleaning exhaust gas which is capable of retaining its catalytic activity for a long time even under severe operating conditions above 900° C. for example.

Another object of the present invention is to provide a process for advantageously making such a catalytic converter.

According to one aspect of the present invention, a catalytic converter for cleaning exhaust gas comprises a heat-resistant support; and a coating formed on the support, the coating including at least one kind of catalytically active substance and a zirconium oxide; wherein the zirconium oxide having a pre-aging specific surface area I and a post-aging specific surface area A, the aging being performed in an atmosphere of 1,000° C. for 5 hours; and wherein $A/I \geq 0.4$ and $I \geq 40$ m²/g.

The zirconium oxide incorporated in the coating of the catalytic converter described above exhibits a relatively small decrease of specific surface area (i.e., a relatively high A/I value) even after the high temperature aging (1,000° C., 5 hours). Therefore, even if the catalytic converter is repetitively subjected to a high temperature of no less than 900° C., the zirconium oxide is subsequently sintered only to a limited extent. As a result, the catalytic activity of the catalytic converter can be maintained for a longer time than is conventionally possible.

The zirconium oxide, which experiences a relatively small decrease of specific surface area, may be prepared by suitably adjusting the composition of the zirconium oxide or by suitably adjusting the conditions for making the zirconium oxide.

More specifically, the zirconium oxide may be a zirconium complex oxide represented by the following formula,

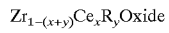

$$Zr_{1-(x+y)}Ce_xR_y \text{Oxide}$$

where R represents a rare earth element other than Ce or an alkaline earth metal, and where the zirconium complex oxide meets $0.12 \leq x \leq 0.25$ and $0.02 \leq y \leq 0.15$ in this formula.

Examples of rare earth elements "R" other than Ce include Sc, Y, La, Pr, Nd, Pm, Sm, Eu, Gd, Tb, Dy, Ho, Er, Tm, Yb and Lu. Of these examples, La and Nd are preferred. Examples of alkaline earth metals include Be, Mg, Ca, Sr and Ba.

Alternatively, the zirconium oxide may be subjected to a preliminary aging or baking step at a high temperature for positively causing grain growth (sintering). Such preliminary aging or sintering restrains or limits subsequent grain growth (a decrease of specific surface area) under high temperature operating conditions, thereby prolonging the service life of the catalytic converter.

Typically, the catalytically active substance contained in the coating may be a precious metal such as Ru, Rh, Pd, Ag, Os, Ir, Pt and Au. Preferably, however, the catalytically active substance may be selected from a group consisting of Pt, Rh and Pd. Each of these active substances may be used alone or in combination with another.

The coating may also contain at least one heat-resistant inorganic oxide selected from a group consisting of alumina ($Al_2O_3$), silica ($SiO_2$), titania ($TiO_2$) and magnesia (MgO). Particularly useful is activated alumina. Further, the coating may further comprise an oxygen-storing oxide such as cerium complex oxide.

The catalytically active substance may be supported selectively on the particles of the zirconium oxide or the heat-resistant inorganic oxide before the zirconium oxide or the inorganic oxide is coated on the heat-resistant support. Alternatively, the catalytically active substance may be coated on the heat-resistant support at the same time when the zirconium oxide (and optionally the inorganic oxide) is coated on the support. Further, the catalytically active substance may be supported at the surface of the coating after the zirconium oxide (and optionally the inorganic oxide) is coated first on the heat-resistant support.

The heat-resistant support, which may be made of cordierite, mullite, α-alumina or a metal (e.g. stainless steel), should preferably have a honeycomb structure. In this case, the coating is formed in each cell of the honeycomb structure.

The zirconium complex oxide having the above formula may be prepared by using known techniques such as coprecipitation process or alkoxide process.

The coprecipitation process includes the steps of preparing a mixture solution which contains respective salts of Ce, Zr and other element (a rare earth element other than Ce or an alkaline earth metal) in a predetermined stoichiometric ratio, then adding an aqueous alkaline solution or an organic acid to the salt solution for causing the respective salts to coprecipitate, and thereafter heat-treating the resulting coprecipitate for oxidization to provide a target complex oxide.

Examples of starting salts include sulfates, nitrates, hydrochlorides, phosphates, acetates, oxalates, oxychloride, oxynitrate, oxysulfate and oxyacetate. Examples of aqueous alkaline solutions include an aqueous solution of sodium carbonate, aqueous ammonia and an aqueous solution of ammonium carbonate. Examples of organic acids include oxalic acid and citric acid.

The heat treatment in the coprecipitation process includes a heat-drying step for drying the coprecipitate at about 50~200° C. for about 1~48 hours after filtration, and a baking step for baking the coprecipitate at about 350~1,000° C. (preferably about 400~700° C.) for about 1~12 hours. During the baking step, the baking conditions (the baking temperature and the baking period) should be selected depending on the composition of the zirconium complex oxide so that at least part of the complex oxide is in the form of solid solution.

The alkoxide process includes the steps of preparing an alkoxide mixture solution which contains Ce, Zr and other element (a rare earth element other than Ce or an alkaline earth metal) in a predetermined stoichiometric ratio, then adding a deionized water to the alkoxide mixture solution for causing Ce, Zr and the other element to hydrolyze, and thereafter heat-treating the resulting hydrolysate to provide a target complex oxide.

Examples of alkoxides usable for preparing the alkoxide mixture solution include methoxides, ethoxides, propoxides and butoxides. Instead, ethylene oxide addition salts of each of the elements are also usable.

The heat treatment in the alkoxide process may be performed in the same way as that in the coprecipitation process.

A precious metal such as Pt, Rh or Pd as the catalytically active substance may be supported on the zirconium oxide or the heat-resistant inorganic oxide (other than the zirconium oxide) by using known techniques. For instance, a solution containing a respective salt (e.g. 1–20 wt %) of Pt (and/or Rh and/or Pd) is first prepared, the zirconium oxide or the other heat-resistant inorganic oxide is then impregnated with the salt-containing solution, and thereafter the oxide is heat-treated. Examples of salts usable for this purpose include nitrate, dinitro diammine nitrate, and chloride. The heat-treatment, which is performed after impregnation and filtration, may include drying the oxide by heating at about 50~200° C. for about 1~48 hours and thereafter baking the complex oxide at about 350~1,000° C. for about 1~12 hours.

Alternatively, a precious metal may be supported on the zirconium oxide or the other heat-resistant inorganic oxide at the time of performing the coprecipitation process or the alkoxide process by adding a salt solution of the precious metal to the mixture salt solution or the alkoxide mixture solution.

The coating may be formed by mixing the zirconium oxide or the other heat-resistant inorganic oxide with distilled water to prepare an aqueous slurry, then depositing the slurry on the heat-resistant support, and finally drying the support in an electric oven. The catalytically active substance may be supported selectively on the zirconium oxide or the heat-resistant inorganic oxide before the zirconium oxide or the inorganic oxide is coated on the heat-resistant support. Alternatively, the catalytically active substance may be coated on the heat-resistant support at the same time when the zirconium oxide (and optionally the other inorganic oxide) is coated on the support. Further, the catalytically active substance may be supported at the surface of the coating after the zirconium oxide (and optionally the other inorganic oxide) is coated first on the heat-resistant support.

According to a second aspect of the present invention, a process for making a catalytic converter for cleaning exhaust gas is provided which comprises the steps of: performing preliminary baking of a zirconium oxide for causing a decrease in specific surface area of the zirconium oxide; and coating the preliminarily baked zirconium oxide on a heat-resistant support together with at least one kind of catalytically active substance.

As previously described, since the zirconium oxide is subjected to the preliminary baking before being coated on the heat-resistant support, the specific surface area of the zirconium oxide decreases to a certain level in advance and therefore undergoes a subsequent decrease of specific surface area only to a limited extent. As a result, the service life of the catalytic converter is correspondingly prolonged.

Preferably, the preliminary baking step may be performed at a temperature of not lower than 700° C.

Again, the zirconium oxide maybe a zirconium complex oxide represented by the following formula,

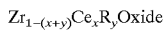

$$Zr_{1-(x+y)}Ce_xR_yOxide$$

where R represents a rare earth element other than Ce or an alkaline earth metal, the zirconium complex oxide meeting $0.12 \leq x \leq 0.25$ and $0.02 \leq y \leq 0.15$ in said formula. Further, the catalytically active substance may be selected from a group consisting of Pt, Rh and Pd.

Other features and advantages of the present invention will be apparent from the following detailed description of the preferred embodiments given with reference to the accompanying drawings.

DETAILED DESCRIPTION OF THE PREFERRED EMBODIMENTS

Next, various examples of the present invention will be described together with comparative examples. However, it should be appreciated that the present invention is in no way limited by these examples.

EXAMPLE 1

In Example 1, zirconium complex oxide having a composition of $Zr_{0.8}Ce_{0.16}Nd_{0.02}La_{0.02}Oxide/2$ wt % Pt/2 wt %Rh was prepared and determined for its specific surface area and catalytic activity before and after high-temperature redox aging, respectively. Here, the notation "/2 wt %Pt/2 wt %Rh" represents that 100 parts by weight of zirconium complex oxide (not supporting any precious metal) supports 2 parts by weight of Pt and 2 parts by weight of Rh.

Preparation of Zirconium Complex Oxide

The zirconium complex oxide having the above-noted composition was prepared by the so-called alkoxide process. Specifically, an alkoxide mixture solution was first prepared by dissolving, in 200 cm$^3$ of toluene, 61 g (0.136 mol) of zirconium ethoxyethylate, 13.5 g (0.0272 mol) of cerium ethoxyethylate, 1.4 g (0.0034 mol) of neodymium ethoxyethylate, and 1.4 g (0.0034 mol) of lanthanum ethoxyethylate. Then, the alkoxide mixture solution was gradually dripped into 600 cm$^3$ of deionized water in about 10 minutes for causing hydrolysis of the alkoxide mixture. Then, the toluene and water content of the alkoxide mixture solution was removed by vaporization. Then, the remaining hydrolysate (precursor) was dried by ventilation at 60° C. for 24 hours. Then, the resulting zirconium complex oxide was baked in an electric oven at 800° C. for 1 hour for causing preliminary grain growth (preliminary sintering), thereby providing powder of the target Ce—Zr—Nd—La complex oxide.

Further, the zirconium complex oxide powder was impregnated with an aqueous solution of dinitro diammine-platinum nitrate and rhodium nitrate. The thus impregnated powder was first dried at 60° C. for 24 hours and then baked at 600° C. for 3 hours. As a result, the zirconium complex oxide was made to support 2 parts by weight of Pt and 2 parts by weight of Rh relative to 100 parts by weight of the complex oxide.

High-Temperature Redox Aging

The Pt- and Rh-supporting zirconium complex oxide thus obtained was subjected to high-temperature redox aging by cyclically placing the zirconium complex oxide in three different atmospheres each held at a high temperature of about 1,000° C. More specifically, a cycle of 30 minutes was repeated ten times for a total time of 5 hours, in which cycle the oxygen-storing oxide was placed in an inert atmosphere for 5 minutes, then in an oxidizing atmosphere for 10 minutes, again in the inert atmosphere for 5 minutes, and finally in a reducing atmosphere for 10 minutes. The respective composition of the oxidizing atmosphere, the inert atmosphere and the reducing atmosphere used here is listed in Table 1 below. During this test, each of the three different atmospheres was supplied at a flow rate of 300 dm$^3$/hr and maintained at a temperature of about 1,000° C. by the inclusion of high-temperature H$_2$O vapor.

TABLE 1

| Components | Oxidizing | Inert | Reducing |
|---|---|---|---|
| H$_2$ | — | — | 0.5 vol % |
| CO | — | — | 1.5 vol % |
| O$_2$ | 1.0 vol % | — | — |
| CO$_2$ | 8.0 vol % | 8.0 vol % | 8.0 vol % |
| H$_2$O | 10 vol % | 10 vol % | 10 vol % |
| N$_2$ | 81 vol % | 82 vol % | 80 vol % |

Determination of Specific Surface Area

The specific surface area of the zirconium complex oxide was determined before and after the high-temperature redox aging, respectively, in accordance with the BET adsorption isotherm method which itself is well known.

Determination of Catalytic Activity

The catalytic activity of the Pt- and Rh-supporting zirconium complex oxide was evaluated by determining the CO—NO$_x$ cross point removal before and after the high-temperature redox aging, respectively. The evaluation of the catalytic activity by calculating the value (quotient) of (pre-aging removal)/(post-aging removal). The "CO—NO$_x$ cross point removal" as used herein means the point (removal in percentage) where the CO removal and the NO$_x$ removal coincide while the exhaust gas being cleaned changes gradually in composition from a fuel-rich state to a fuel-lean state.

Results

The results of the surface area determination and the catalytic activity determination in Example 1 are shown in Table 2 below together with those for Examples 2~3 and Comparison 3 to be described hereinafter.

TABLE 2

| | Baking Temp. | Specific Surface Area | | Catalytic Activity |
|---|---|---|---|---|
| | (° C.) | *Pre(m$^2$/g) | **Post(m$^2$/g) | Pre/Post Pre/Post |
| Ex. 1 | 800 | 70 | 40 | 0.57 0.95 |
| Ex. 2 | 900 | 56 | 44 | 0.78 0.97 |
| Ex. 3 | 1000 | 47 | 46 | 0.98 0.99 |
| Com.1 | 400 | 150 | 25 | 0.17 0.60 |

*"Pre" means pre-aging.
**"Post" means post-aging.
Composition: Zr$_{0.8}$Ce$_{0.16}$Nd$_{0.02}$La$_{0.02}$Oxide
Specific Surface Area: Determined by BET

EXAMPLES 2~3 AND COMPARISON 1

In Examples 2~3 and Comparison 1, zirconium complex oxide having the same composition as that of Example 1 was prepared in the same manner except that the zirconium complex oxide was subjected to preliminary baking at respective temperatures of 900° C. (Example 2), 1,000° C. (Example 3) and 400° C. (Comparison 1). Then, the zirconium complex oxide was determined for its specific surface area and catalytic activity before and after high-temperature redox aging in the same manner as in Example 1.

The results of the surface area determination and the catalytic activity determination in these examples are also shown in Table 2 above.

EXAMPLES 4~7 AND COMPARISON 2

In Examples 4~7 and Comparison 2, zirconium complex oxide having a composition of Zr$_{0.75}$Ce$_{0.2}$Y$_{0.05}$Oxide/2 wt %Pt/2 wt %Rh was prepared and determined for its specific surface area and catalytic activity before and after high-temperature redox aging, respectively, in the manner similar to Example 1. However, in these examples, the preliminary baking was performed at respective temperatures of 700° C. (Example 4), 800° C. (Example 5), 900° C. (Example 6), 1,000° C. (Example 7) and 400° C. (Comparison 2).

The results of the surface area determination and the catalytic activity determination in these examples are shown in Table 3 below.

TABLE 3

| | Baking Temp. (° C.) | Specific Surface Area | | | Catalytic Activity |
|---|---|---|---|---|---|
| | | *Pre($m^2$/g) | **Post($m^2$/g) | Pre/Post | Pre/Post |
| Ex. 4 | 700 | 110 | 45 | 0.41 | 0.92 |
| Ex. 5 | 800 | 75 | 50 | 0.67 | 0.95 |
| Ex. 6 | 900 | 60 | 51 | 0.85 | 0.97 |
| Ex. 7 | 1000 | 55 | 54 | 0.98 | 0.99 |
| Com.2 | 400 | 155 | 22 | 0.14 | 0.55 |

*"Pre" means pre-aging.
**"Post" means post-aging.
Composition: $Zr_{0.75}Ce_{0.20}Y_{0.05}$Oxide
Specific Surface Area: Determined by BET

EVALUATION OF EXAMPLES 1~7 AND COMPARISONS 1~2

From Tables 2 and 3, it is observed that the zirconium complex oxide, when subjected to preliminary baking at a temperature of no less than 700° C., suffered a lesser decrease of specific surface area than when baked at a temperature of 400° C. (which was a normal baking temperature). Further, it is also observed that the post-aging specific surface area of the zirconium complex oxide was higher when preliminarily baked at a temperature of no less than 700° C. than when baked at a temperature of This is why the Pt- and Rh-supporting zirconium complex oxide retained a high catalytic activity even after the high-temperature redox aging (see the last column in Tables 2 and 3). By contrast, the zirconium complex oxide, when preliminary baked at a low temperature of 400° C., exhibited a higher CO—$NO_x$ cross point removal at an initial stage but soon lost its catalytic activity after the high-temperature redox aging.

Thus, it is concluded that the zirconium oxide (or zirconium complex oxide) according to the present invention provides a relatively high catalytic activity for a long time.

What is claimed is:

1. A catalytic converter for cleaning exhaust gas comprising:
   a heat-resistant support; and
   a coating formed on the support, the coating including a zirconium oxide and at least one kind of catalytically active substance supported on the zirconium oxide;
   wherein the zirconium oxide having a pre-aging specific surface area I and a post-aging specific surface area A; wherein A/I≧0.4 and I≧40 $m^2$/g when the aging is performed in an atmosphere of 1,000° C. for 5 hours; and
   wherein the zirconium oxide is a zirconium complex oxide represented by the following formula,

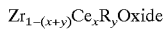
   $Zr_{1-(x+y)}Ce_xR_y$Oxide

Where R represents a rare earth element other than Ce or an alkaline earth metal, the zirconium complex oxide meeting 0.12≦x≦0.25 and 0.02≦y≦0.15 in said formula.

2. The catalytic converter according to claim 1, wherein the catalytically active substance is selected from a group consisting of Pt, Rh and Pd.

3. The catalytic converter according to claim 1, wherein the coating further comprises an oxygen-storing oxide.

4. The catalytic converter according to claim 3, wherein the oxygen-storing oxide is a cerium complex oxide.

5. The catalytic converter according to claim 1, wherein the coating further comprises at least one heat-resistant inorganic oxide selected from a group consisting of alumina, silica, titania and magnesia.

6. The catalytic converter according to claim 1, wherein the heat-resistant support has a honeycomb structure.

* * * * *